United States Patent [19]

Ethridge

[11] 4,212,191
[45] Jul. 15, 1980

[54] DIFFERENTIAL PRESSURE GAUGE

[75] Inventor: Noel H. Ethridge, Bel Air, Md.

[73] Assignee: The United States of America as represented by the Secretary of the Army, Washington, D.C.

[21] Appl. No.: 20,890

[22] Filed: Mar. 15, 1979

[51] Int. Cl.² .................................................. G01L 7/08
[52] U.S. Cl. .............................. 73/861.47; 73/861.65; 73/716
[58] Field of Search ............... 73/716, 722, 212, 147, 73/35

[56] References Cited

U.S. PATENT DOCUMENTS

| | | | |
|---|---|---|---|
| 1,428,780 | 9/1922 | Jaray | 73/182 |
| 2,396,703 | 3/1946 | Kamler et al. | 73/35 |

FOREIGN PATENT DOCUMENTS 339996  8/1921  Fed. Rep. of Germany ............ 73/182

*Primary Examiner*—Donald O. Woodiel
*Attorney, Agent, or Firm*—Nathan Edelberg; Robert P. Gibson; Max Yarmovsky

[57] ABSTRACT

A gauge for measuring differential pressure in an explosive blast wave, wind tunnel, or shock tube, utilizes a tubular housing having a conical axially aligned inlet port, a cylindrical cavity which is divided into fore and aft sections by a transversely disposed pressure responsive diaphram. A plurality of symmetrically disposed off-set stagnation inlet tubes and a plurality of circumferentially positioned flow compensated side-on overpressure input slots are used to communicate with each of the respective fore and aft sections of the cavity. Variation in stagnation and side-on overpressures cause diaphram movement which is detected by a friction-free sensing member.

14 Claims, 8 Drawing Figures

U.S. Patent    Jul. 15, 1980    Sheet 1 of 2    4,212,191
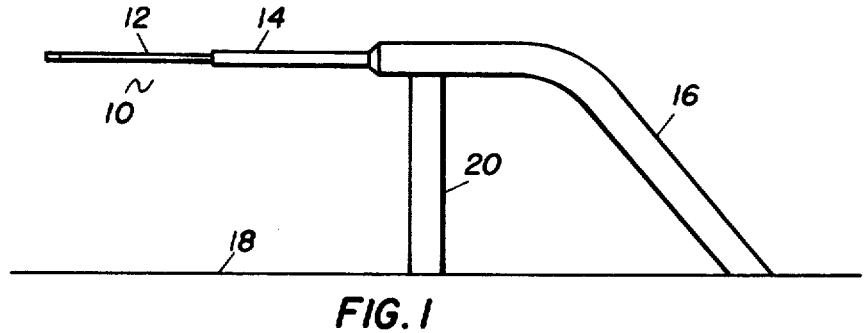
FIG. 1
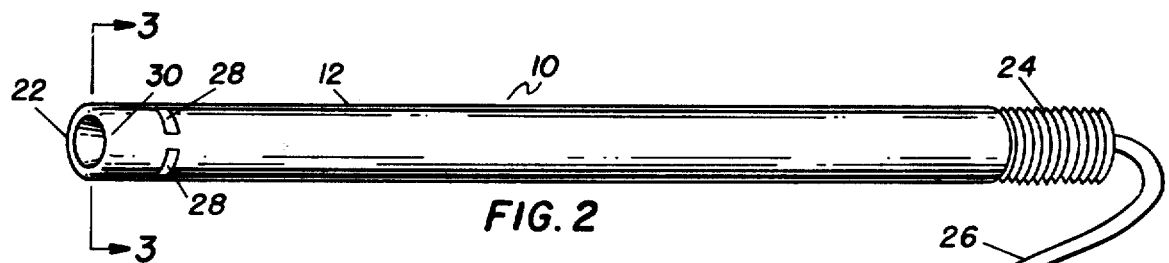
FIG. 2
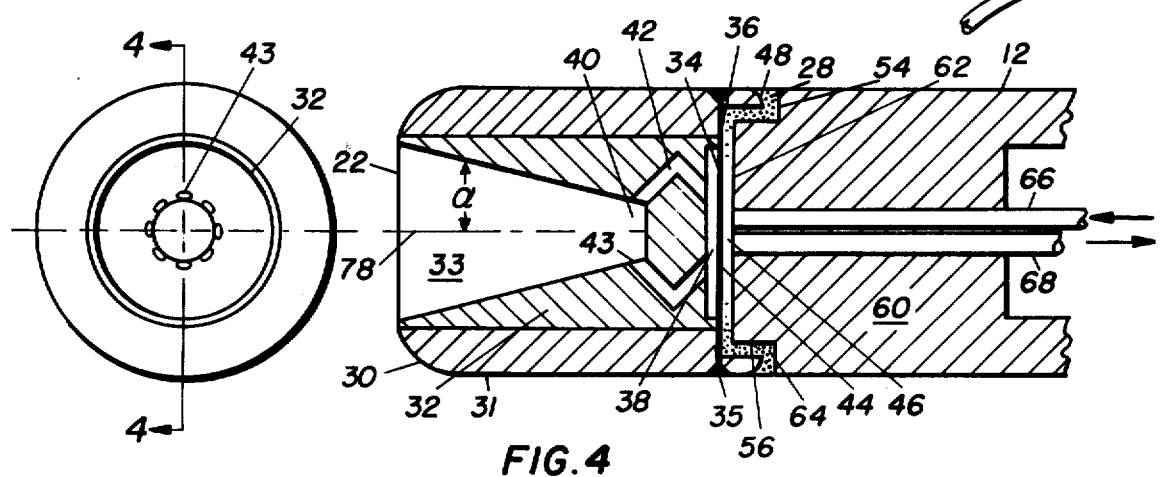
FIG. 3
FIG. 4
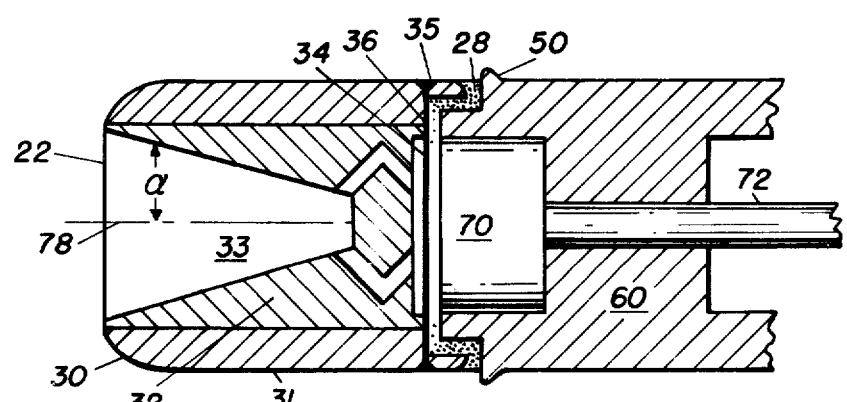
FIG. 5

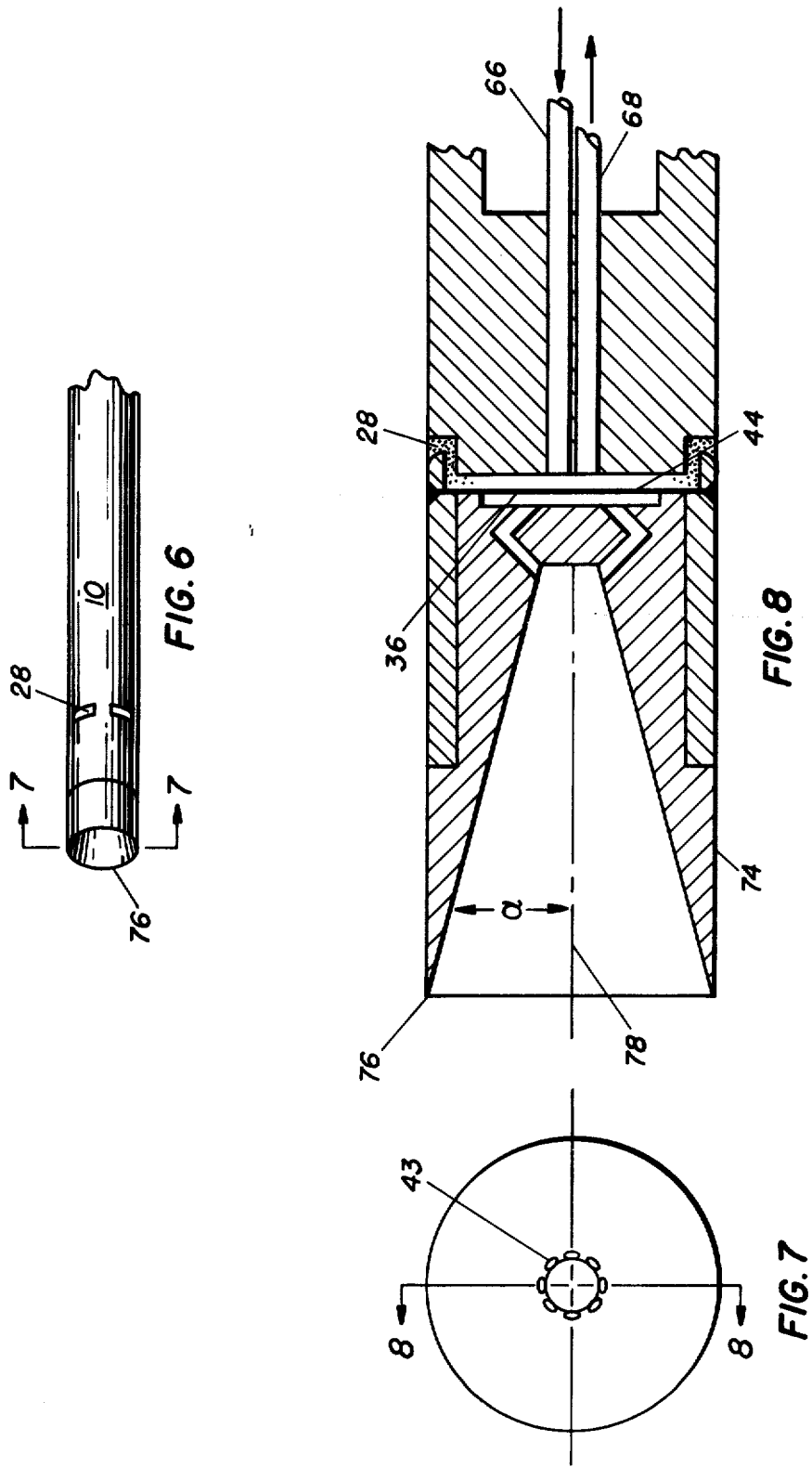

DIFFERENTIAL PRESSURE GAUGE

GOVERNMENTAL INTEREST

The invention described herein may be manufactured, used and licensed by or for the Government for governmental purposes without the payment to me of any royalty thereon.

PRIOR ART STATEMENT

The applicant has reviewed the current technique for determining dynamic pressure in a blast wave and finds that it involves the use of independent measurements of stagnation overpressure and side-on overpressure from gauges which are physically separated from each other, usually by several feet. Data taken from these separate gauges may be used to compute the dynamic pressure by use of fluid flow relations which are described, for example, in "Elements of Gas Dynamics" by H. W. Liepmann and A. Roshko, John Wiley and Sons, Inc. N.Y., N.Y., 1957, p. 148-149. The difficulty with the aforementioned technique is that, when dealing with applications involving low side-on overpressures, the errors in the measured signals become as large as or larger than the magnitude of the dynamic pressure of interest.

The applicant has also reviewed U.S. Pat. Nos. 3,126,739 and 3,521,486 and finds them of interest and to a limited extent pertinent to the present application. The U.S. Pat. No. 3,126,739 of Whitehill is designed to indicate a change in flow velocity by sensing the movement of fluid in one of the inlet tubes and cannot be used to measure the differential pressure versus time of a blast wave. The gauge design of U.S. Pat. No. 3,521,486 of Conkling, uses a moveable diaphram to respond to differential pressure, but the gauge's outputis proportional to flow velocity. In contradistinction the present invention has an output which is proportional to differential pressure.

BACKGROUND OF THE INVENTION

Various means have been used in the prior art for determining the dynamic pressure that a blast wave produces on a target. The loading on a target produced by a blast wave usually may be described in terms of two phases. First a diffraction phase occurs which involves a phenomena produced when a shock front encounters and engulfs a target. A drag phase occurs after the rapid pressure variations associated with the diffraction process have ceased and a quasi-steady flow has been established over the target. The loading due to one or both of these phases may produce damage to a target, and therefore must be defined for calculating the effect upon a target or for correlating an effect with previous test results.

In order to determine the drag phase loading on a target, the dynamic pressure is required as a function of time at the target location. The dynamic pressure is generated by the air flow occuring in the blast wave. Dynamic pressure may be derived from separate measurements of stagnation overpressure and side-on overpressure versus time. The problem with prior art devices has been that they have introduced large errors in the determination of dynamic presure, particularly at shock front overpressures less than 10 psi. The prior art technique involved the use of independent measurements of stagnation overpressure and side-on overpressure from gauges which are physically separated to produce pressure measurements. At low side-on pressures the errors in the measured signals may become as large or larger than the magnitude of the dynamic pressure of interest. Thus the value of the differential pressure (Dq) and hence dynamic pressure (Pq) calculated from independently measured value of stagnation overpressure (Pt) and side-on overpressure (Ps) may be very much in error, with the error ranging from 30 to 100 percent in regions of particular interest.

The dynamic pressure (Pq) may be expressed in terms of the differential pressure (Dq) and side-on overpressure (Ps) by the following equation:

$$Pq = [\gamma/(\gamma - 1)] (Ps + Pa) \{ [1 + Dq/(Ps + Pa)]^{(\gamma-1)/\gamma} - 1 \} \quad (1)$$

where
- $\gamma$ = ratio of specific heats
- $Ps$ = side-on overpressure
- $Pa$ = ambient atmospheric pressure
- $Dq$ = differential pressure
- $Pt$ = stagnation overpressure and where $$Dq = Pt - Ps \quad (2)$$

The present invention permits the use of a single sensor to measure the differential pressure (Dq) versus time generated by the air flow in a blast wave, another gauge to measure side-on overpressure Ps versus time, and then to calculate dynamic pressure (Pq) versus time from these measured valves using Equation (1). Because the differential pressure (Dq) is nearly equal to dynamic pressure (Pq) at low pressures, the change from the value of the differential pressure (Dq) produced by the use of Equation (1) is small, and is relatively insensitive to the value of side-on overpressure (Ps) used.

The problem with differential pressure gauges now available is that they are not designed to measure differential pressure in a blast wave. Some prior art gauges have a cylindrical cavity divided into two parts by a diaphram with inlet tube to provide a path for fluid to the cavities on either side of the diaphram. However, these gauges are unsuitable for measurement in the blast wave application because of the slow frequency response produced by the necessity of fluid flowing through the inlet tubes and filling or leaving the cavities.

SUMMARY OF THE INVENTION

The present invention relates to a pressure gauge suitable for measurement of differential pressure on a target within a blast wave. The present device provides a measurement of differential pressure at a single location which is a substantial improvement over prior art techniques of using measurements from two gauges which are usually separated by a distance of several feet. The present gauge has sensing cavity volumes disposed on either side of a diaphragm which are relatively small. Inlet passageways lead thereto which are relatively short in length and have inlet openings which are relatively large, which enable the gauge to have a frequency response of at least 1000 Hertz. The side-on inlet port edges are configured to produce a compensating pressure effect at the side-on overpressure ports to improve the accuracy of the gauge. Off-set inlet passageway design provides protection to the diaphragm from particle impacts and filter material disposed in the inlet passageways provides accoustic damping. The use of a short conical inlet for stagnation overpressure, a cylindrical housing, and circumferential inlet slots for the side-on overpressure renders the gauge output relatively insensitive to changes in direction of incident fluid flow. A noncontacting sensing member for detecting diaphram deflection increases gauge reliability by eliminating possible damage to strain elements on the diaphram caused by temperature changes, particle impact, or flow forces.

The present device is designed to produce differential pressure across a diaphram which will change rapidly as the blast wave changes and be directly related to the dynamic pressure of the blast wave fluid flow.

An object of the present invention is to provide a pressure gauge suitable for measuring differential pressure on a target within a blast wave.

Another object of the present invention is to provide means for measurement of differential pressure within a blast wave by a single gauge.

Another object of the present invention is to provide a differential pressure gauge for measuring pressure in a blast wave having a frequency response of at least 1000 Hertz.

A further object of the present invention is to provide a differential pressure gauge having off-set inlet paths which assure protection to a sensing diaphram from impacts by particles accelerated to a high velocity from a blast wave.

For a better understanding of the present invention, together with other and further objects thereof, reference is made to the following descriptions taken in connection with the accompanying drawings.

BRIEF DESCRIPTION OF THE DRAWINGS

FIG. 1 is an elevational view of a differential pressure gauge in a field mount position.

FIG. 2 is an isometric view of a differential pressure gauge.

FIG. 3 is an end view of a differential pressure gauge taken along line 3—3 of FIG. 2.

FIG. 4 is a partial diametral cross-sectional view taken along line 4—4 of FIG. 3.

FIG. 5. is an alternate embodiment of the differential pressure gauge shown in FIG. 4.

FIG. 6 is a partial isometric view of a differential gauge designed to measure differential pressure in supersonic flow.

FIG. 7 is an end view of the pressure gauge taken along line 7—7 of FIG. 6 designed for use in supersonic flow.

FIG. 8 is a partial diametral cross-sectional view taken along line 8—8 of FIG. 7 of the gauge. Throughout the following description like reference numerals are used to denote like parts of the drawings.

DESCRIPTION OF THE PREFERRED EMBODIMENTS

FIG. 1 illustrates how a differential pressure gauge 10, comprising a cylindrically shaped housing 12 coupled to a tubular coupling member 14, is mounted at a target location in a field pipe mount 16 above the ground surface 18. In the field application, coupling member 14 is used to connect the small diameter gauge 10 with a much larger diameter pipe 16 in order to minimize flow disturbances due to the pipe 16 and mounting support 20.

Referring now to FIGS. 2, the gauge 10 comprises a long cylindrical housing section 12 having a length about twenty times its diameter. Gauge 10 has stagnation pressure inlet end 22 and a threaded mounting end 24 from which output cable 26 exists. Operatively positioned proximate to the stagnation inlet end 22 are a plurality of circumferentially disposed equally spaced side-on over-pressure slots 28 which admit side-on overpressure to one side of a pressure-sensing diaphram, to be further described hereinafter. The nose 30 of the fore body member 31, at the stagnation inlet, is rounded when it is desired to take subsonic flow measurements. Where supersonic flow measurements are of primary interest, the stagnation overpressure inlet diameter approximates the diameter of the housing 12 and has sharp edges rather than rounded corners.

Referring now to FIGS. 3-5, FIG. 4 shows an embodiment using optical sensing of diaphram deflection whereas FIG. 5 illustrates an alternative embodiment showing the use of inductive coils for sensing deflections. The stagnation overpressure gauge inlet end 22, has a removable cylindrically shaped stagnation inlet member 32 therein having a converging conical inlet cavity 33 having a cone half-angle $\alpha$, which in the preferred embodiment, does not exceed 15%. The 15-degree half-angle cone provides good insensitivity to changes in fluid flow direction while providing a reasonably short path length to the front surface 34 of a disk shaped diaphram 36. Diaphram 36 is preferably made of a metallic material such as 42Ni–58Fe alloy. Diaphram 36 is transversely positioned and circumferentially soldered or welded under tension in fore body member 31 and abuts cylindrically shaped fore sensing cavity 38. Cavity 38 communicates with the narrow base end 40 of the conical cavity of stagnation inlet member 32 via a plurality of equally spaced off-set passageways 42 through stagnation inlet port 43. The passageways 42 leading to fore diaphram cavity 38 in front of diaphram 36 are drilled holes intersecting to form a path with approximately a 90° change in direction, so that incoming dust particles or other foreign matter cannot impact the diaphram 36 directly. The rear side 44 of the diaphram 36 lies in an aft cylindrically shaped sensing cavity 46 which in turn communicates with the side-on overpressure inlet slots 28 which have rounded edges 48 whose radius is approximately equal to the width of the slot.

The volume of the fore and aft sensing cavities 38 and 46 respectively are made as small as possible to reduce the filling time and hence the time to register changes in the outside pressure. The diaphram 36 is made as stiff as possible while allowing enough movement to be detected. There is no direct use of fluid flow velocity in an inlet tube to produce an indication of dynamic pressure.

The rounded edges 48 of the slots 28 are on the side of the slot nearest the gauge inlet end 22. The rounded leading edges 48 produce a slight increase in pressure in the slot 28, which will partially compensate for the lowering of overpressure at the slot inlet orifice caused by the higher-than-free-stream velocity near the rounded nose 30 of the gauge 10. An alternate way of producing a compensating higher pressure in slots 28, as shown in the FIG. 5 embodiment, is to make the rear peripheral edge 50 of the slots 28 larger in diameter than the forward section 52 of the cylinder 12. The difference in the edge diameters can be adjusted to change the amount of pressure increase, and the shape of the rear edge 50 can be rounded also to modify the pressure increase. The slot passageways 54 have right angle bends 56 therein to eliminate a direct line-of-sight path to the rear side 44 of the diaphram 36 from outside the gauge. The slots 28 extend all the way around the circumference of the cylinder 12, except for the small amount of metal needed for structural strength to connect the fore body member 31 of the gauge to the rear body member 60. The inlet side-on over-pressure slots 28 form the outer boundary of the aft sensing cavity 46 to the rear of diaphram 36. The clearance between the diaphram 36 and the opposite wall 62 of the rear body member is made as large as possible up to the width of the slot path. The clearance is approximately one millimeter, but cannot be made less than 0.1 millimeters in order to avoid malfunction by dust particle jamming. A filter material 64, such as fine glass wool, may be placed in the side-on over-pressure inlet slots 28 and in the stagnation overpressure inlet paths 42 to keep out dust particles and to provide acoustic damping.

FIG. 4 shows an optional means for sensing diaphram 36 deflections and FIG. 5 shows an alternative electromagnetic means. In the FIG. 4 embodiment a pair of fiber optic cables 66 and 68 are used to carry light beams to and from the rear side 44 of the diaphram respectively. The fiber optic cable means is especially useful in applications requiring a small diameter gauge. The amount of light reflected by the diaphram 36 and transmitted by light pipe 68 out of the gauge 10 is related to the deflection of the diaphram and to the dynamic pressure being sensed.

In the FIG. 5 embodiment, deflection of the diaphram 36 is sensed by variable induction sensing coils 70, which react to a change in magnetic flux produced by the deflection of the diaphram 36 and produce an electrical output signal which is carried from the gauge 10 to a recording device, not shown, by electrical cables 72.

Referring now to FIGS. 6—8, a modification of FIGS. 3 and 4, a gauge is shown which is designed to measure differential pressure in supersonic flow of a blast wave. The essential changes required are the replacement of the rounded nose of the forward body member 58 with a forward body member 74. Forward body member 74 has a sharp edge stagnation inlet 76 produced by extention of the conical cavity to the full diameter of the cylinder and use of a stiffer diaphram 36 for the normally higher differential pressures associated with supersonic flow.

In operation gauge 10 is normally installed so that the longitudinal axis 78 of the housing cylinder 12 is parallel to the expected direction of flow. The stagnation overpressure inlet end 22 is positioned to face the incoming fluidic flow. If the flow is produced by a blast wave, the shockwave first touches the nose 30 of the gauge, moves into the conical stagnation overpressure inlet cavity 33 and reflects a value which may be more than twice the value of the side-on incident pressure of the shock wave. The shock wave traveling along the outside of the cylinder 12 reaches the side-on overpressure inlet slots 28 and is somewhat directed into the slots 28 by the rounded leading edge 48 of the slots 28. The aft sensing cavity 46, behind the diaphram 36, fills until the pressure in the cavity 46 is equal to that at the slot openings 28. However, the peak reflected pressure on the front surface 34 of the diaphram 36 occurs before the aft cavity 46 fills to side-on overpressure, so that initially there is a very high differential pressure of very short duration acting on the diaphram 36. After the aft cavity 46 fills, the gage 10 senses changes in differential pressure with a maximum frequency response determined by the fill rate of the fore and aft sensing cavities 38 and 46 respectively. The fill rate is governed by the cavity volumes, inlet areas, path lengths, and kind and amount of damping materials used. The diaphram 36 is designed to be sufficiently stiff so that its frequency response is not a limiting factor. The motion of the diaphram is sensed either optically or electromagnetically as aforedescribed, and the output signal is conditioned and recorded, or used as needed for the problem of interest.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the Unites States is:

1. An apparatus for measuring differential pressure that an explosion produced blast wave produces on a target comprising:
   a tubular housing having a stagnation inlet end and a threaded mounting end;
   removable stagnation inlet overpressure means operatively disposed in said stagnation inlet end of said housing and adapted for responsively sampling incident fluid flow of said blast wave;
   compensating side-on inlet overpressure means for sampling side-on inlet pressure produced by said blast wave;
   diaphram means, transversely positioned in said housing, for moving in response to said differential pressure between said stagnation inlet overpressure means and said compensating side-on inlet overpressure means; and
   friction-free sensing means operatively positioned in said housing for detecting motion in said diaphram means and for generating an output signal in response to said motion.

2. An apparatus as recited in claim 1 wherein said tubular housing comprises a rounded nose inlet end for subsonic flow.

3. An apparatus as recited in claim 2 wherein said removeable stagnation inlet overpressure means comprises:
   a cylindrically shaped stagnation inlet member having a converging conically shaped inlet cavity having a cone half-angle α, which preferably does not exceed 15°, a plurality of equally spaced off-set passageways communicate on one end with a narrow base end of said conical inlet cavity and on another end with a fore sensing cylindrical diaphram cavity.

4. An apparatus as recited in claim 3 wherein said off-set passageways form a path having approximately a 90° change in direction leading to an aft sensing cylindrical diaphram cavity, said off-set passageways preventing incoming dust particles from impacting directly on said diaphram means.

5. An apparatus as recited in claim 4 wherein said compensating side-on inlet overpressure means comprises a plurality of circumferentially disposed equally spaced slots which admit side-on overpressure flow to a rear side of said diaphram means.

6. An apparatus as recited in claim 5 wherein said compensating side-on inlet overpressure means includes a plurality of circumferentially disposed equally spaced slots having rounded leading edges, said rounded leading edges producing an increase in pressure in said slots which partially compensate for the lowering of overpressure at slot inlet orifices caused by higher-than-free-stream velocity proximate to said round nose inlet end.

7. An apparatus as recited in claim 6 wherein said compensating side-on inlet overpressure means includes a plurality of equally spaced side-on inlet slots wherein rear peripheral edges of said slots are made larger in diameter than the leading edges of said slots, said larger diameter rear peripheral edges being adjusted to change the amount of pressure increase in said slots to compensate for the lowering of overpressure at slot inlet orifices caused by higher-than-free stream velocity proximate to said round nose inlet end.

8. An apparatus as recited in claims 6 or 7 wherein said diaphram means comprises a disk shaped metal member circumferentially soldered and transversely positioned under tension intermediate said fore sensing cylindrical diaphram cavity and said aft sensing cylindrical diaphram cavity.

9. An apparatus as recited in claim 8 wherein said plurality of equally spaced off-set passageways of said stagnation inlet overpressure means and said plurality of equally spaced side-on inlet slots of said compensating side-on inlet overpressure means includes a filter material operatively disposed therein to keep out dust particles from said off-set passageways and said side-on inlet slots and to provide acoustic damping.

10. An apparatus as recited in claim 9 wherein said sensing means comprises a pair of fiber optical cables for carrying a light beam to illuminate said diaphram means and to carry out a reflected light output signal related to the deflections of said diaphram and to dynamic pressure being sensed by said apparatus.

11. An apparatus as recited in claim 10 wherein said sensing means comprises variable inductance sensing coils proximately disposed to said diaphram means and adapted to be responsive to changes in magnetic flux produced by deflection of said diaphram means.

12. An apparatus as recited in claim 11 wherein said disk shaped metal member comprises a 42% nickel 58% iron alloy.

13. An apparatus as recited in claim 10 wherein said filter material includes fine glass wool.

14. An apparatus as recited in claim 11 wherein said tubular housing comprisesa sharp-edged nose for supersonic measurement of flow.

* * * * *